Patented Oct. 11, 1932

1,882,562

UNITED STATES PATENT OFFICE

EUGEN GLIETENBERG AND WILHELM NEELMEIER, OF LEVERKUSEN-ON-THE-RHINE, AND JOSEF HALLER, OF WIESDORF-ON-THE-RHINE, GERMANY, ASSIGNORS TO GENERAL ANILINE WORKS, INC., OF NEW YORK, N. Y., A CORPORATION OF DELAWARE

WATER SOLUBLE DIAZO-AMINO COMPOUND

No Drawing. Application filed April 25, 1929, Serial No. 358,153, and in Germany April 30, 1928.

The present invention relates to new water-soluble diazo-amino compounds, more particularly it relates to compounds of the following general formula:

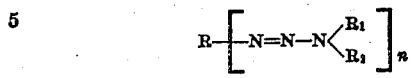

wherein R stands for the nucleus of an aromatic amine capable of producing azodyestuffs, which may be substituted by substituents of the group consisting of alkyl, alkoxy, halogen, the nitro group and a substituted amino group, and which may be connected with another aromatic nucleus by means of an azo group, $R_1$ and $R_2$ stand either for the same or different residues of the group comprising alkyl-, benzyl-, phenyl- and cyclohexyl-groups, at least one of which being substituted by a substituent inducing solubility in water, such as the $-COOH, -SO_3H$ or $-O.SO_2H$-groups, and $n$ stands for one of the numbers one and two.

Our new compounds are obtainable by slowly introducing the solution of a diazo or tetrazo compound which has been prepared in the usual manner by diazotization of a primary aromatic amine or amino azo dyestuff of the kind referred to with hydrochloric or sulfuric acid and sodium nitrite into the solution of about equimolecular quantity or about double molecular quantity respectively of a secondary amine of the general formula

wherein $R_1$ and $R_2$ stand either for the same or different residues of the group comprising alkyl-, benzyl-, phenyl- and cyclohexyl-residues, but at least one of the symbols $R_1$ and $R_2$ containing a substituent inducing solubility in water, such as the -COOH, $-SO_3H$ and $O.SO_2H$ groups, care being taken that an acid binding agent, such as magnesia, sodium acetate, a caustic alkali, an alkali metal carbonate or bicarbonate, pyridine or the like is present for removing the free acid liberated in the condensation process. Such secondary amines of the general formula:

are, for example, to mention only a few of those known, sarcosine, diglycolamino acid, dibenzylamino disulfonic acid and methylamine-formaldehyde sulfurous acid. The process is generally carried out at low temperature, say at about 0° C. to about 10° C.; the new condensation products either separate during the reaction or are salted out with potassium- or sodium chloride, when the reaction is complete after a short time.

Our new compounds are obtained generally as colorless to yellowish colored crystals; they are very stable both in the dry state and also in aqueous neutral or alkaline solution. On the addition of a mineral acid, an acid mineral acid salt, such as sodium bisulfate, or a strong organic acid, such as acetic acid, formic acid and oxalic acid, they are split up into the two starting components, that means into a diazo or tetrazo compound and into one or two molecules of a secondary amine of the general formula

$R_1$ and $R_2$ meaning the same as above described.

Our new condensation products are valuable substances in the manufacture of dyestuffs and for combating insect pests.

Our invention is illustrated by the following examples, without being limited thereto:

*Example 1.*—141.5 grams of 4-chloro-2-toluidine are diazotized with 200 ccm. of 28% hydrochloric acid, 40 ccm. of water and 690 ccm. of 10% sodium nitrite solution. The diazo solution is run slowly into a solution of 250 grams of the sodium salt of mono-ethyl-2-toluidine-4-sulfonic acid ($CH_3=1$) cooled below 10° C. and containing as acid fixing agent 120 grams of potassium carbonate. The reaction is soon complete and the condensation product having in its free state the following formula:

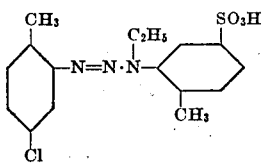

separates during the reaction as the potassium salt in a beautiful crystalline form.

Instead of potassium carbonate other acid fixing agents, such as sodium carbonate, bicarbonate, magnesia, caustic alkalies and the like can be used.

*Example 2.*—95 grams of sodium carbonate are added to a solution of 235 grams of the sodium salt of mono-ethyl-meta-sulfanilic acid in 500 ccm. of water, and at a temperature below 10° C. the diazo solution obtained from 168 grams of 5-nitro-2-anisidine ($OCH_3=1$), 400 ccm. of water, 200 ccm. of 28% hydrochloric acid and 690 ccm. of 10% sodium nitrite solution is slowly run in. The sodium salt of the reaction product is partially precipitated. On the addition of sodium chloride a larger quantity thereof is obtained.

*Example 3.*—138 grams of meta-nitraniline are diazotized as described above, and this solution is added slowly to a solution of 220 grams of sodium monomethylaniline-4-sulfonate in 500 ccm. of water cooled below 10° C. and containing 120 grams of potassium carbonate. The condensation product forms readily and separates in the form of the well crystallized potassium salt on salting out with potassium chloride.

*Example 4.*—When the diazo solution obtained from one mol of 1-amino-carbazole is run slowly into an alkaline sodium carbonate solution of 1.1 mols of sarcosine, the formation of the following diazo-amino compound having in its free state the following formula:

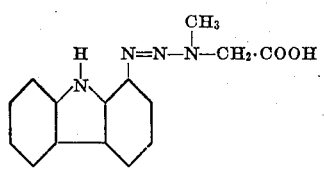

takes place very quickly. Its sodium salt can be separated completely by the addition of sodium chloride.

*Example 5.*—157.5 grams of 4-chloro-2-anisidine are diazotized and introduced slowly into an alkaline sodium carbonate solution of 1.1 mols of monoethyl-p-toluidine sulfonic acid. The sodium salt of the condensation product

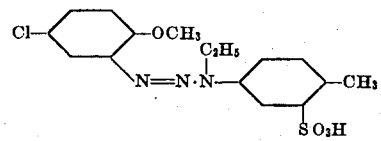

which partly separates already during the reaction is completely separated by the addition of sodium chloride.

*Example 6.*—244 grams of dianisidine are tetrazotized in 1000 ccm. of water and 400 ccm. of 28% hydrochloric acid with 1400 ccm. of 10% sodium nitrite solution. This tetrazo solution is run slowly at a temperature below 10° C. into an aqueous solution of 500 grams of sodium monoethyl-4-toluidine-3-sulfonic acid, to which about 250 grams of potassium carbonate have been added. The majority of the potassium salt of the condensation product of the formula:

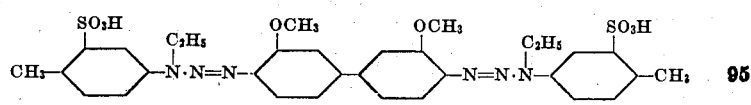

formed is separated by salting out.

*Example 7.*—127.5 grams of 4-chloro-aniline are diazotized in 400 ccm. of water and 200 ccm. of 28% hydrochloric acid with 690 ccm. of sodium nitrite solution, and this solution is added slowly to an aqueous solution of 300 grams of the neutral sodium salt of the monoglycinated 4-sulfanilic acid rendered alkaline by means of alkali carbonate. The condensation product can be obtained in a beautiful crystalline form on the addition of common salt.

*Example 8.*—The diazo solution obtained from 168 grams of 5-nitro-2-anisidine is run slowly into an alkaline potassium carbonate solution of 1.1 mols of monoethyl-p-toluidine sulfonic acid, whereupon the condensation product partly separates. When the reaction is complete, the potassium salt of the condensation product of the following formula:

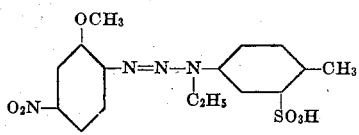

is isolated completely by salting out with potassium chloride.

*Example 9.*—When the diazo solution obtained from one molecule of 5-nitro-2-toluidine is caused to react with a solution (rendered alkaline with bicarbonate) of 1.1 mols of the condensation product obtained from equivalent parts of 4-toluidine and formaldehyde bisulfite, the resulting reaction product;

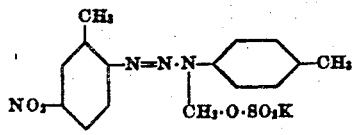

can be separated in the customary manner.

*Example 10.*—138 grams of m-nitraniline are diazotized in the customary manner and coupled with 153 grams of aminohydroquinone dimethyl ether in hydrochloric acid solution. The suspension of the azo dyestuff, thus obtained is then converted into the diazoazo compound by treatment with 120 grams of concentrated hydrochloric acid and 69 grams of sodium nitrite, which is poured slowly with stirring into a solution of 100 grams of sarcosine containing an excess of sodium carbonate. When the reaction is complete, the condensation product is separated by the addition of sodium chloride; it is a brown powder, which dissolves in water with a yellowish brown coloration. In its free state it possesses the following constitution:

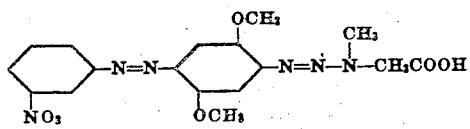

*Example 11.*—The diazo solution obtained from 141.5 grams of 4-chloro-2-toluidine, 200 ccm. of 28% hydrochloric acid, 400 ccm. of water and 690 ccm. of 10% sodium nitrite solution is run slowly at a temperature of below 10° C. into a solution of 100 grams of sarcosine in water with the addition of 185 grams of potassium carbonate. The coupling reaction is soon complete. The solution is evaporated to dryness under reduced pressure, and the residue containing the potassium salt of the condensation product

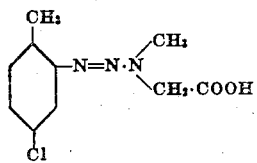

can be used without further treatment.

Instead of potassium carbonate, sodium carbonate, bicarbonate, caustic alkalies and the like, can be used as acid fixing agents.

*Example 12.*—The diazo solution obtained from 141.5 grams of 4-chloro-2-toluidine, 200 ccm. of 28% hydrochloric acid, 400 ccm. of water and 690 ccm. of 10% sodium nitrite solution is slowly run into a solution of 146 grams of diglycolamino acid

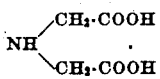

in water with the addition of 256 grams of potassium carbonate. The reaction is soon complete. The condensation product

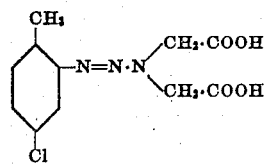

can be separated in a colorless beautifully crystalline form by the careful addition of acetic acid while cooling with ice. It crystallizes from alcohol in colorless needles, which decompose at 170° C.

*Example 13.*—The diazo solution obtained as in Example 11 from one mol of 5-chloro-2-toluidine is run slowly into a solution of 1.1 mols of dibenzylamine disulfonic acid, rendered alkaline with potassium carbonate. The condensation is soon complete and the condensation product

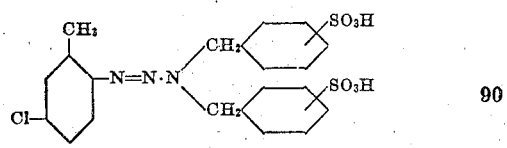

can be separated in a crystalline form as the potassium salt.

*Example 14.*—One mol of 5-nitro-2-toluidine is diazotized in hydrochloric acid solution, and this solution is added slowly in the cold to a solution (rendered alkaline with alkali carbonate) of 1.1 mols of the condensation product obtained from one mol of hexyhydroaniline and one mol of chloro acetic acid. The condensation product separates already during the reaction as a potassium salt.

*Example 15.*—The diazo solution obtained from one mol of ortho-anisidine is run slowly in the cold into an aqueous solution of 1.1 mols of N-methylbenzylamino sulfonic acid in the presence of potassium bicarbonate. The condensation product formed can be separated in the crystalline form as the potassium salt.

*Example 16.*—The formaldehyde bisulfite compound from one mol of formaldehyde and one mol of sodium bisulfite is stirred for half an hour at 60–70° C. with one mol of glycocol when condensation to the following substance occurs:—

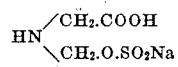

To the aqueous solution of this secondary amine is run in slowly in the presence of potassium carbonate the diazo solution obtained from 0.9 mol of 5-chloro-2-toluidine. Condensation is soon complete. The condensation product can be separated as the potassium salt on the addition of potassium chloride.

*Example 17.*—157.5 grams of 4-chloro-2- anisidine are diazotized and introduced slowly into an alkaline sodium carbonate solution of 1.1 mols of sarcosine. The formation of the following diazo amino compound having in the free state the formula:

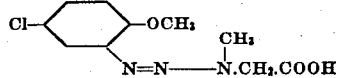

takes place very quickly. The new compound can be separated completely by the addition of sodium chloride.

Example 18.—256 grams of 4-methyl-5-benzoylamido-2-anisidine are diazotized and introduced slowly into an alkaline sodium carbonate solution of 1.1 mols of sarcosine. The formation of the following diazoamino compound, having in the free state the formula:

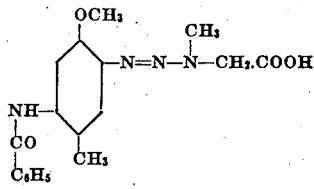

takes place very quickly. The new compound can be separated completely by the addition of sodium chloride.

We claim:

1. The compounds of the probable general formula:

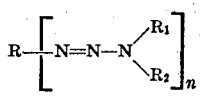

wherein R stands for the nucleus of an aromatic amine capable of producing azodyestuffs which may be substituted by substituents of the group consisting of alkyl, alkoxy, halogen, the nitro group and a substituted amino group, $R_1$ and $R_2$ stand for substituents of the group consisting of alkyl-, benzyl-, phenyl- and cyclohexyl-groups, at least one of which containing a substituent of the group consisting of the COOH, SO$_3$H and O.SO$_2$H groups, and $n$ stands for one of the numbers one and two, being generally colorless to yellowish colored crystals, being very stable in their dry state and in aqueous and alkaline solution, and being valuable substances in the manufacture of dyestuffs and for combating insect pests.

2. The compounds of the probable general formula:

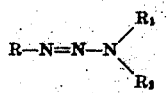

wherein R stands for the nucleus of an aromatic amine capable of producing azodyestuffs which may be substituted by substituents of the group consisting of alkyl, alkoxy, halogen, the nitro group and a substituted amino group, $R_1$ and $R_2$ stand for substituents of the group consisting of alkyl-, benzyl-, phenyl- and cyclohexyl-groups, at least one of which containing a substituent of the group consisting of the COOH, SO$_3$H and O.SO$_2$H groups, being generally colorless to yellowish colored crystals, being very stable in their dry state and in aqueous and alkaline solution, and being valuable substances in the manufacture of dyestuffs and for combating insect pests.

3. The compounds of the probable general formula:

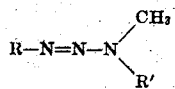

wherein R stands for the nucleus of an aromatic amine capable of producing azodyestuffs which may be substituted by substituents of the group consisting of alkyl, alkoxy, halogen, the nitro group and a substituted amino group, $R_1$ stands for a substituent of the group consisting of an alkyl group which may be substituted by a carboxylic acid group, a penyl-, a benzyl-sulfonic acid group and a cyclohexyl residue, and $R_2$ stands for a substituent of the group consisting of an alkyl sulfonic acid group, an alkyl carboxylic acid group, a phenyl sulfonic acid group and a benzyl sulfonic acid group, being generally colorless to yellowish colored crystals, being very stable in their dry state and in aqueous and alkaline solution, and being valuable substances in the manufacture of dyestuffs and for combating insect pests.

4. The compounds of the probable general formula:

R—N=N—N⟨CH$_3$ / R′ wherein R stands for the nucleus of an aromatic amine capable of producing azodyestuffs which may be substituted by substituents of the group consisting of alkyl, alkoxy, halogen, the nitro group and a substituted amino group, R′ stands for an akyl which is substituted by a carboxylic acid group, being generally colorless to yellowish colored crystals, being very stable in their dry state and in aqueous and alkaline solution, and being valuable substances in the manufacture of dyestuffs and for combating insect pests.

5. The compounds of the probable general formula:

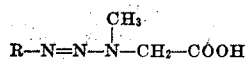

wherein R stands for the nucleus of an aromatic amine capable of producing azodyestuffs which may be substituted by substituents of the group consisting of alkyl, alkoxy, halogen, the nitro group and a substituted amino group, being generally colorless to yellowish colored crystals, being very stable in their dry state and in aqueous and alkaline solution, and being valuable substances in the manufacture of dyestuffs and for combating insect pests.

6. The compounds of the probable general formula:

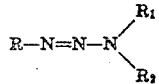

wherein R stands for a benzene nucleus which may be substituted by substituents of the group consisting of alkyl, alkoxy, halogen, the nitro group and a substituted amino group, $R_1$ and $R_2$ stand for substituents of the group consisting of alkyl-, benzyl-, phenyl- and cyclohexyl-groups, at least one of which containing a substituent of the group consisting of the COOH, $SO_3H$ and $O.SO_2H$ groups, being generally colorless to yellowish colored crystals, being very stable in their dry state and in aqueous and alkaline solution, and being valuable substances in the manufacture of dyestuffs and for combating insect pests.

7. The compounds of the probable general formula:

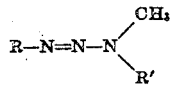

wherein R stands for a benzene nucleus which may be substituted by substituents of the group consisting of alkyl, alkoxy, halogen, the nitro group and a substituted amino group, R' stands for an alkyl group which is substituted by a carboxylic acid group, being generally colorless to yellowish colored crystals, being very stable in their dry state and in aqueous and alkaline solution, and being valuable substances in the manufacture of dyestuffs and for combating insect pests.

8. The compounds of the probable general formula:

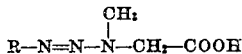

wherein R stands for a benzine nucleus which may be substituted by substituents of the group consisting of alkyl, alkoxy, halogen, the nitro group and a substituted amino group, being generally colorless to yellowish colored crystals, being very stable in their dry state and in aqueous and alkaline solution, and being valuable substances in the manufacture of dyestuffs and for combating insect pests.

9. The compound of the following formula:

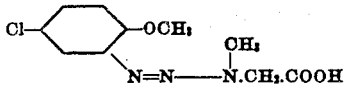

being a yellowish colored crystalline substance, being very stable in its dry state and in aqueous and alkaline solution, and being a valuable substance in the manufacture of dyestuffs and for combating insect pests.

10. Compounds of the probable general formula:

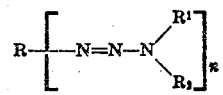

wherein R stands for the nucleus of an aromatic amine capable of producing azo dyestuffs which may be substituted by substituents of the group consisting of alkyl, alkoxy, halogen, the nitro group and a substituted amino group, $R_1$ stands for a substituent of the group consisting of alkyl, benzyl phenyl and cyclohexyl groups which may be substituted by a substituent of the group consisting of the COOH, $SO_3H$ and $O.SO_2H$ groups, $R_2$ stands for a substituent of the group consisting of alkyl, benzyl and cyclohexyl groups substituted by a substituent of the group consisting of the COOH, $SO_3H$ and $O.SO_2H$ groups, and the phenyl group substituted by a substituent of the group consisting of the $SO_3H$ and $O.SO_2H$ groups, and $n$ stands for one of the numbers 1 and 2, being generally colorless to yellowish colored crystals, being very stable in their dry state and in aqueous and alkaline solution, and being valuable substances in the manufacture of dyestuffs and for combating insect pests.

11. Compounds of the probable general formula:

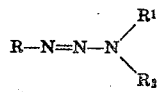

wherein R stands for the nucleus of an aromatic amine capable of producing azo dyestuffs which may be substituted by substituents of the group consisting of alkyl, alkoxy, halogen, the nitro group and a substituted amino group, $R_1$ stands for a substituent of the group consisting of alkyl, benzyl, phenyl and cyclohexyl groups which may be substituted by a substituent of the group consisting of the COOH, $SO_3H$ and $O.SO_2H$ groups, $R_2$ stands for a substituent of the group consisting of alkyl, benzyl and cyclohexyl groups substituted by a substituent of the group consisting of the COOH, $SO_3H$ and $O.SO_2H$ groups, and the phenyl group substituted by a substituent of the group consisting of the $SO_3H$ and $O.SO_2H$ groups, being generally colorless to yellowish colored crystals, being very stable in their dry state and in aqueous and alkaline solution, and being valuable substances in the manufacture of dyestuffs and for combating insect pests.

12. Compounds of the probable general formula:

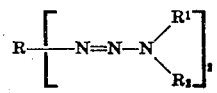

wherein R stands for a diphenyl nucleus which may be substituted by alkoxy and $R_1$ and $R_2$ stand for substituents of the group consisting of alkyl, benzyl, phenyl and cylohexyl groups, at least one of which contains a substituent of the group consisting of the COOH, $SO_3H$ and $O.SO_2H$ groups, being generally colorless to yellowish colored crystals, being very stable in their dry state and aqueous and alkaline solution, and being valuable substances in the manufacture of dyestuffs and for combating insect pests.

In testimony whereof we have hereunto set our hands.

EUGEN GLIETENBERG. [L. S.]
WILHELM NEELMEIER. [L. S.]
JOSEF HALLER. [L. S.]